United States Patent
Bosco et al.

(10) Patent No.: US 9,473,455 B2
(45) Date of Patent: Oct. 18, 2016

(54) DATA PLANE PACKET PROCESSING TOOL CHAIN

(75) Inventors: John Bosco, Darnestown, MD (US); Dow Summers, Purcellville, VA (US); Kenneth Ryan, Fairfax, VA (US)

(73) Assignee: VERISIGN, INC., Reston, VA (US)

( * ) Notice: Subject to any disclaimer, the term of this patent is extended or adjusted under 35 U.S.C. 154(b) by 1069 days.

(21) Appl. No.: 13/536,169

(22) Filed: Jun. 28, 2012

(65) Prior Publication Data

US 2013/0007880 A1 Jan. 3, 2013

Related U.S. Application Data

(60) Provisional application No. 61/502,504, filed on Jun. 29, 2011.

(51) Int. Cl.
*H04L 29/06* (2006.01)
*H04L 29/08* (2006.01)
*H04L 29/12* (2006.01)

(52) U.S. Cl.
CPC ....... *H04L 63/0227* (2013.01); *H04L 63/1458* (2013.01); *H04L 69/12* (2013.01); *H04L 69/32* (2013.01); *H04L 61/1511* (2013.01)

(58) Field of Classification Search
CPC ... H04L 69/12; H04L 69/32; H04L 63/0227; H04L 63/1458
See application file for complete search history.

(56) References Cited

U.S. PATENT DOCUMENTS

| | | | |
|---|---|---|---|
| 6,330,659 B1 | 12/2001 | Poff | |
| 7,020,696 B1 | 3/2006 | Perry et al. | |
| 7,263,597 B2 | 8/2007 | Everdell et al. | |
| 7,327,757 B2 | 2/2008 | Ghahremani et al. | |
| 2003/0059200 A1* | 3/2003 | Cuijpers et al. | 386/46 |
| 2004/0148343 A1 | 7/2004 | Mottes | |
| 2004/0250124 A1* | 12/2004 | Chesla et al. | 713/201 |
| 2008/0133300 A1 | 6/2008 | Jalinous | |
| 2009/0240874 A1* | 9/2009 | Pong | 711/105 |
| 2010/0106742 A1* | 4/2010 | Guruswamy | 707/773 |
| 2012/0033673 A1* | 2/2012 | Goel | 370/400 |

FOREIGN PATENT DOCUMENTS

| | | |
|---|---|---|
| WO | 9926122 | 5/1999 |
| WO | WO 2008/112769 A2 | 9/2008 |

OTHER PUBLICATIONS

Author Unknown, "Consolidating Communications and Networking Workloads onto one Architecture," White Paper, http://www.intel.com/content/dam/doc/white-paper/consolidating-networking-workload-onto-ai.pdf, 2010 Intel Corporation, 10 pages.

(Continued)

*Primary Examiner* — Jeffrey Pwu
*Assistant Examiner* — Thong Truong
(74) *Attorney, Agent, or Firm* — MH2 Technology Law Group, LLP (57) ABSTRACT

This present disclosure relates to systems and methods for providing a data plane processing tool chain for processing packets that can use OSI layers 4 and above in the data plane without using a hypervisor. The disclosure has multiple processing capabilities, including: packet filtering, resolving DNS packets, generating packets, packet forwarding, performing DNS look up, time-stamping DNS packets, writing packets to disk, load-balancing, and protecting against DDOS attacks.

17 Claims, 5 Drawing Sheets

(56) References Cited

OTHER PUBLICATIONS

Yang Tao et al., "New System Approach to Network Platform Architecture," IDF 2011: Intel Developer Forum, Jan. 13, 2011, 37 pages.
Rummery, Audrey, International Search Report and Written Opinion for PCT Application No. PCT/US2012/044532, mailed Dec. 11, 2012, from the European Patent Office, 12 pages total.
Mahdi Dashtbozorgi et al., "A High-Performance and Scalable Multi-Core Aware Software Solution for Network Monitoring," The Journal of Supercomputing, Kluwer Academic Publishers, BO, vol. 59, No. 2, Aug. 17, 2010, pp. 720-743.
Wind River Systems et al., "High-Performance Multi-Core Networking Software Design Options," White Paper, dated Mar. 11, 2012, pp. 1-13 (retrieved from the Internet: http://www.nitelecom.co.kr/2012/skin_board/k_build-Home/b_img_add/windriver/PerformanceDesignOptions_WP_1111.pdf, retrieved on Dec. 4, 2012), 14 pages total.
Singapore Search Report (dated Jun. 30, 2015) and Written Opinion (dated Jul. 31, 2015), Singapore Application No. 2013094735, pp. 1-6.
Advantech, "Deep Packet Inspection", Retrieved from the Internet: http://www2.advantech.com.tw/networks-telecom/ApplicationDetail.aspx?doc_id=%7B800105F0-43E2-48F8-8464-BE80FB874A9, Sep. 9, 2010, pp. 1-3.
Japanese Office Action dated Feb. 9, 2016, Japanese Application No. 2014-518992, pp. 1-6 including Partial English Translation of Japanese Office Action.
Singapore Invitation to Respond to Written Opinion dated Mar. 17, 2016, Singapore Application No. 2013094735, pp. 1-6.

\* cited by examiner

DATA PLANE PACKET PROCESSING TOOL CHAIN

This application claims priority to U.S. Provisional Patent Application No. 61/502,504, filed Jun. 29, 2011, which is incorporated herein by reference in its entirety.

TECHNICAL FIELD

The present disclosure relates generally to systems and methods for providing a data plane processing tool chain for processing packets using OSI layers 4 and above in the data plane.

BACKGROUND

With the development of multi-core processors, applications no longer achieve regular performance improvements due to increases in clock speeds. Often, applications fail to take full advantage of the capabilities of system hardware. The Intel® Data Plane Development Kit (DPDK) was developed to take advantage of multi-core processor hardware. Because the data plane must run at such a high speed, however, the functions implemented in the data plane have been limited. For example, the DPDK is limited to lower-layer packet processing (Open Systems Interconnection ("OSI") layers 1-3) for performing simple services, such as packet forwarding. The DPDK does not support higher-level packet processing (OSI layers 4+) in the data plane. This is because adding these functions using the same technology will adversely impact packet processing performance.

To provide higher-level packet processing, some systems use a hypervisor (i.e., virtual machine manager) to run an isolated operating system that performs higher level packet processing. These solutions are inefficient, however, because they require the additional complexity, cost, and/or overhead of running a virtualized operating system. These conventional solutions also isolate data between operating system instances, which can cause problems when instances need to share data and/or system resources. Thus, tools for OSI layer 4 and above processing without needing a hypervisor are desirable for achieving greater efficiency and processing speed.

Systems and methods consistent with the present disclosure increase the speed of domain name system ("DNS") packet processing by leveraging the data plane. The present disclosure includes several embodiments. For example, in certain embodiments, systems and methods for providing an extended data plane packet processing tool chain are disclosed.

SUMMARY

Systems, methods, and computer-readable mediums are disclosed for processing packets in a data plane using OSI layer 4 and above. Consistent with exemplary embodiments, a method of processing a packet in the data plane may comprise reading a packet from a queue and processing the packet using OSI layer 4 and above using one or more poll mode drivers.

Consistent with further exemplary embodiments, a method of processing data packets may comprise one or more of filtering a DNS packet, wherein the filtering method may include filtering by source IP address, destination port, or wild card search of packet payload data; resolving a DNS packet; generating a packet in the data plane, wherein the type of packet generated may include a DNS query packet or a response packet; forwarding packets into network packet streams; performing a DNS look up; time-stamping a DNS packet; writing a packet to disk; load-balancing by assigning logical cores to data streams; or protecting against a distributed denial-of-service ("DDOS") attack.

Consistent with further exemplary embodiments, the method of processing data packets occurs without using a hypervisor because it does not run multiple operating systems. An application consistent with the present embodiment may run the method of processing data packets in a loop on an assigned logical core.

Consistent with other disclosed embodiments, systems or computer-readable media may store program instructions that are executable by one or more processors to implement any of the methods disclosed herein.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

The accompanying drawings, which are incorporated in and constitute a part of this specification, illustrate various embodiments of the invention and together with the description, serve to explain the principles of the invention. In the drawings.

DETAILED DESCRIPTION

Reference will now be made in detail to the present embodiments, examples of which are illustrated in the accompanying drawings. Wherever possible, the same reference numbers will be used throughout the drawings to refer to the same or like parts. While exemplary embodiments and features of the invention are described herein, modifications, adaptations, and other implementations are possible, without departing from the spirit and scope of the invention. Accordingly, the following detailed description does not limit the invention. Instead, the proper scope of the invention is defined by the appended claims.

Figure 1:
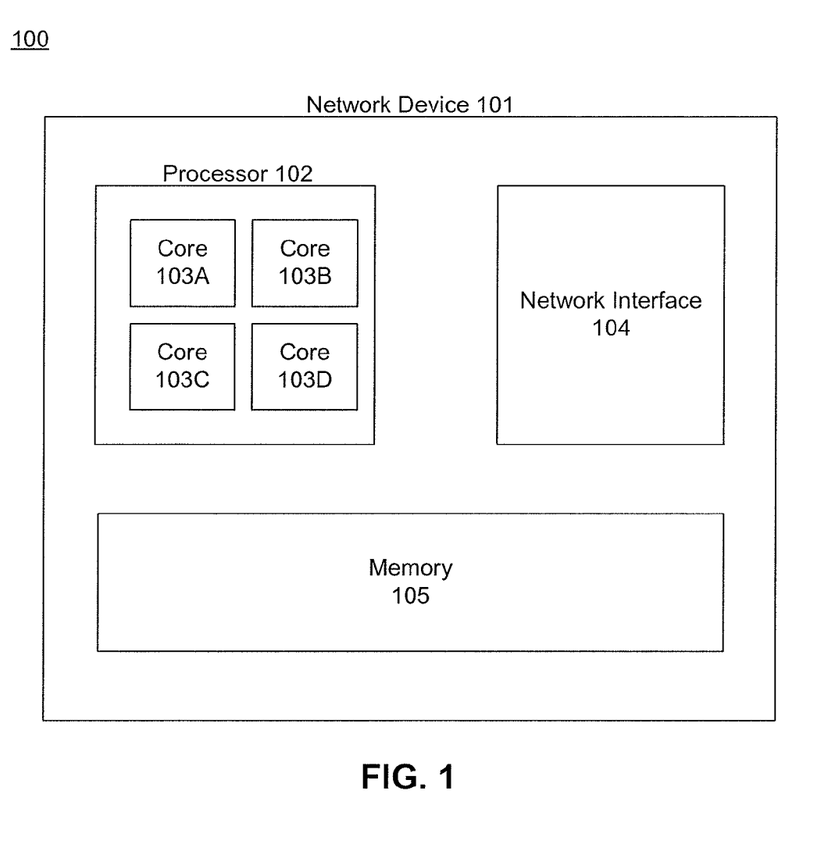
FIG. 1 is a diagram illustrating a system consistent with disclosed embodiments.

FIG. 1 depicts a system consistent with an embodiment of the current disclosure. One or more embodiments disclosed herein may be implemented using a computing device, such as network device 101. Exemplary network device 101 may logically be attached or include one or more processors 102. In some embodiments, at least some of the processors may have one or more cores of varying core configurations and clock frequencies, such as cores 103A-D. The cores 103A-D may support one or more logical cores (not shown), sometimes called threads. To connect to the network, network device 101 may also include one or more network interfaces, such as network interface 104. Network interface 104 may be implemented using software and/or hardware, and may include a network interface card ("NIC") or may include a physical port. Network interface 104 may have one or more packet queues. For example, network interface 104 may include one or more RX queues and/or TX queues. For example, the network interface 104 may have multiple RX and TX queues for a single network port. The network device 104 may also include one or more memories 105 of varying clock frequencies and memory bandwidth. Memories 105 may include any device capable of storing digital data, such as RAMs, ROMs, solid state drives ("SSDs"), hard disk drives ("HDDs"), etc. While a single memory 105 is shown, the network may include multiple memories.

Figure 4:
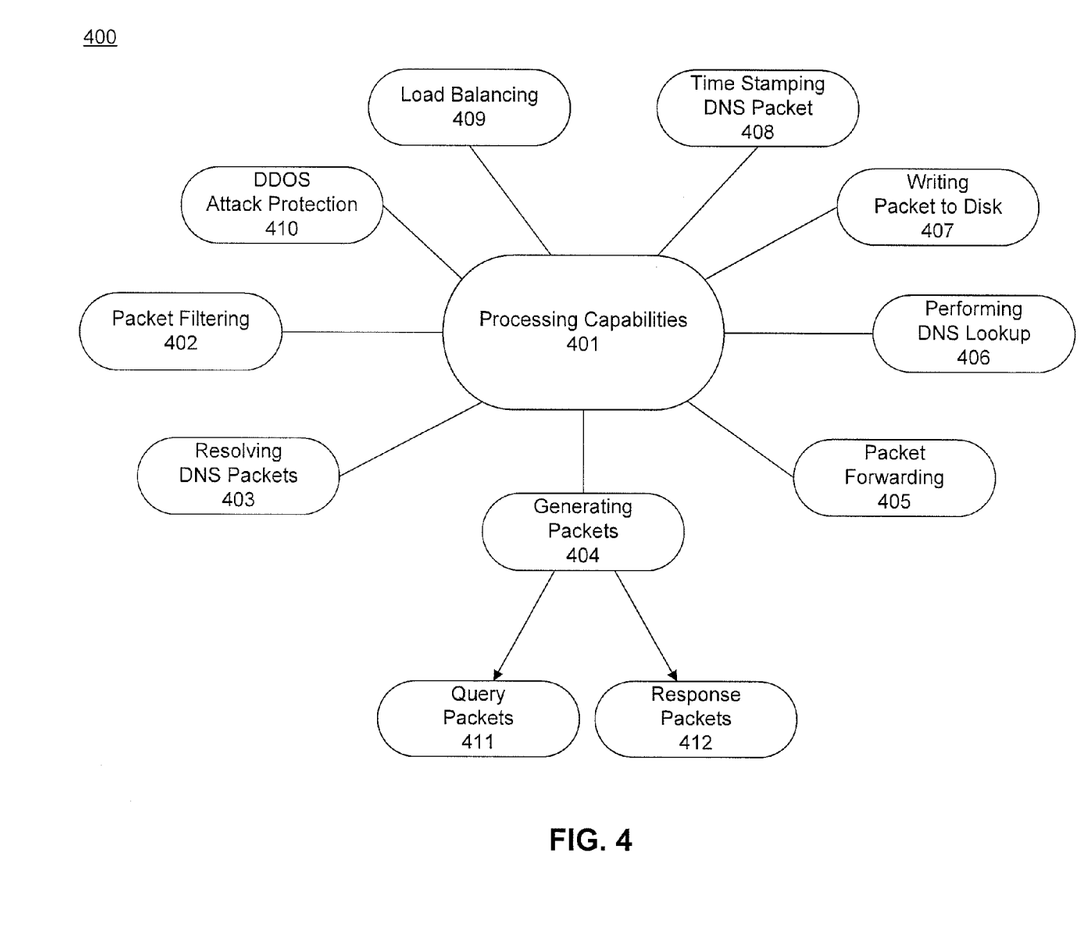
FIG. 4 is a relationship diagram illustrating exemplary processing capabilities, consistent with disclosed embodiments.

In one embodiment, a data plane packet processing tool chain is disclosed. The tool chain may include a set of libraries or functions for performing data plane packet processing not only on OSI layers 1-3 but also on OSI layers 4 and above. FIG. 4 is a relationship diagram illustrating the tool chain's processing capabilities, as illustrated by the outer ring 402-412. Each exemplary capability is explained in further detail through the following descriptions of disclosed embodiments.

In certain embodiments, the tool chain may include libraries that enable applications to perform packet filtering in the data plane. For example, packet filtering may include filtering packets based on a source or destination IP address, source or destination port, and/or a wildcard search of packet headers or payloads. In one embodiment, an application may use the packet filtering to identify DNS packets.

In another embodiment, the tool chain may include functions or libraries for implementing a data recorder. These functions or libraries may include, for example, functions that read up to 7 gigabits (9 million packets), or more, of data per second directly from the network and write the data to memory. In another embodiment, the tool chain may include functions or libraries to divide a single network packet stream into multiple streams, wherein each stream may be directed to a different data file. The tool chain may include functions or libraries that insure that all packets between two servers are directed to the same data stream. The tool chain may include functions or libraries to time-stamp packets with millisecond or greater accuracy. Unique timestamps on the packets may allow for the data files to be reconstituted into a single stream if needed.

The tool chain may include libraries or functions that generate packets in the data plane. In one embodiment, an application may generate DNS query packets. In another embodiment, the application may generate packets that respond to DNS queries. This may take place in OSI layer 6.

Figure 2:
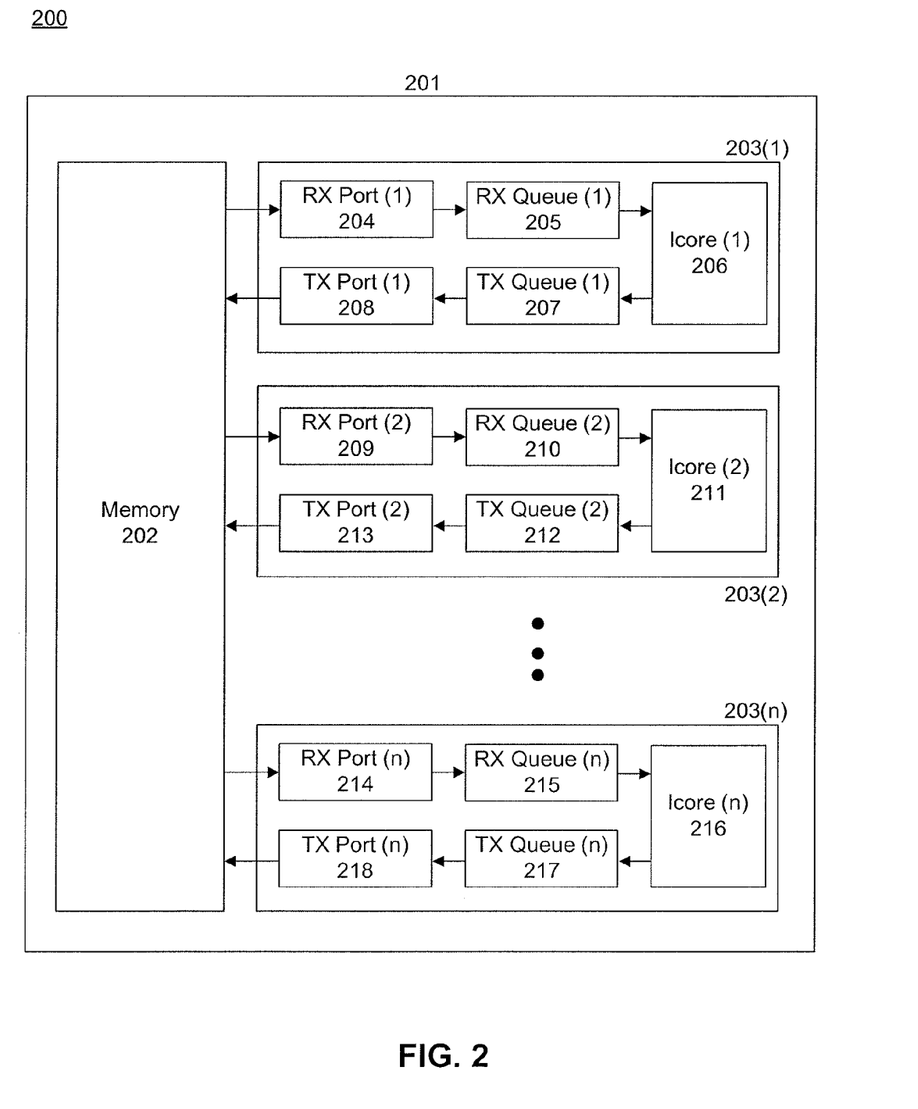
FIG. 2 is a diagram illustrating in detail a system consistent with an embodiment of the current disclosure to demonstrate load balancing.

In an additional embodiment, the tool chain may include libraries or functions that perform load balancing. FIG. 2 depicts a system consistent with an embodiment of the current disclosure. Load balancing may include assigning one or more logical cores, such as Icore(1) through Icore(n), or RX/TX queue pairs, such as RX Queue(1) through RX Queue(n) and TX Queue(1) through TX Queue(n), per network port, such as RX Port(1) through RX Port(n) and TX Port(1) through TX Port(n). Additionally, the load balancing may include assigning logical cores from different cores 103A-D to the one or more RX/TX queue pairs for a network port.

Figure 5:
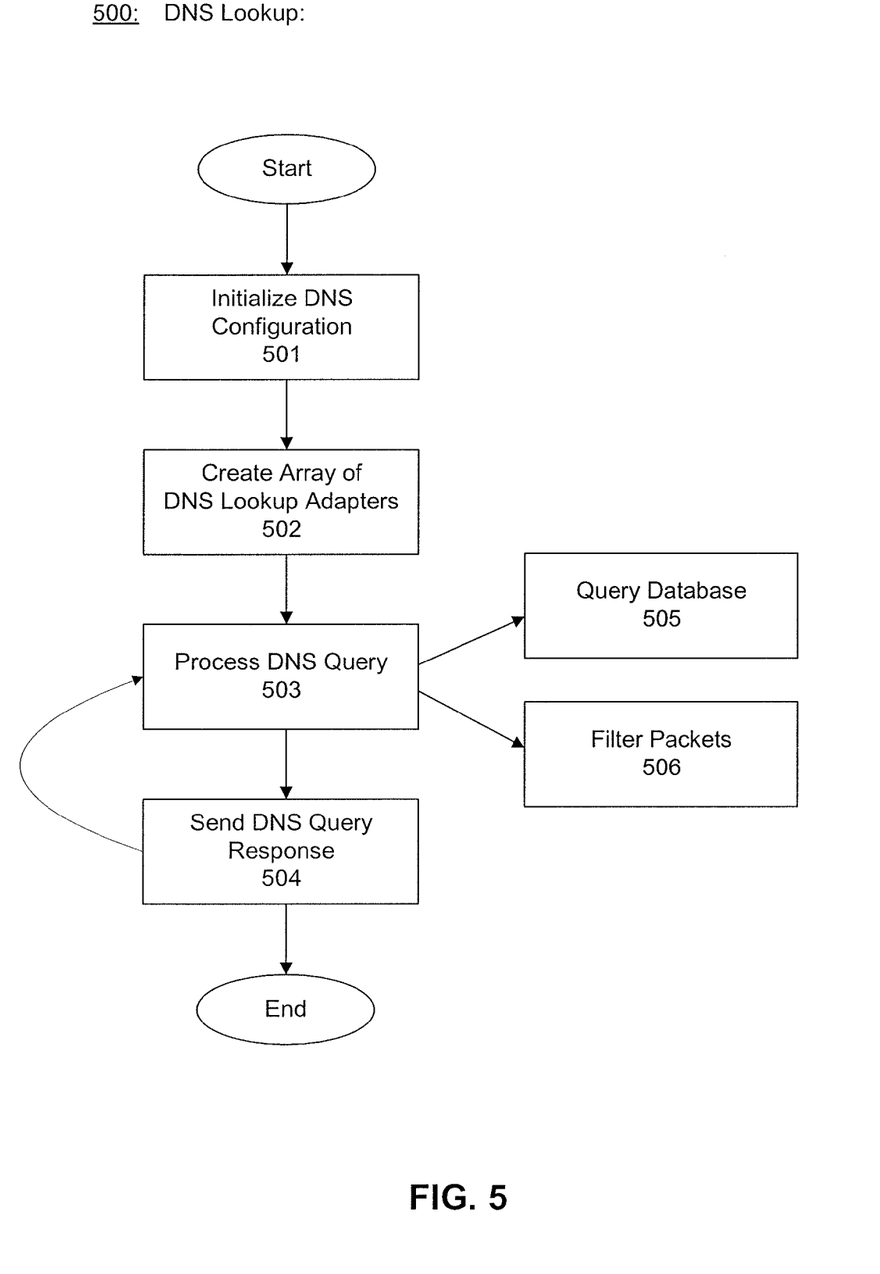
FIG. 5 is a flow diagram illustrating an exemplary process for performing a DNS look up, consistent with disclosed embodiments.

The memory 105 may store one or more applications that include one or more of the aforementioned functions or libraries, or any combination thereof. For example, an application may perform a DNS look up, as depicted in FIG. 5. A DNS look up may include a run-once routine that initializes a DNS configuration, as in step 501. In step 502, the application may create an array of DNS lookup instances. In step 503, the application may execute a process query method in an assigned DNS lookup instance. These methods may resolve a DNS query by querying one or more databases storing DNS information, as in option 505. The application may also use the packet filtering to identify DNS packets that need to be resolved in option 506. Finally, in step 504, the application may generate a response packet that includes a response to the DNS query. Steps 503 through 506 may repeat in a loop without repeating steps 501 or 502. This may take place in OSI layer 6.

In certain embodiments, the applications perform these functions, as well as functions for OSI layer 4 and above, in the data plane. In other words, these applications perform OSI layer 4 and above functions without the need for an operating system or hypervisor. Accordingly, these applications can share memories and information without the need to perform specific globalization functions. Additionally, the applications operate without the overhead of running multiple operating systems.

Figure 3:
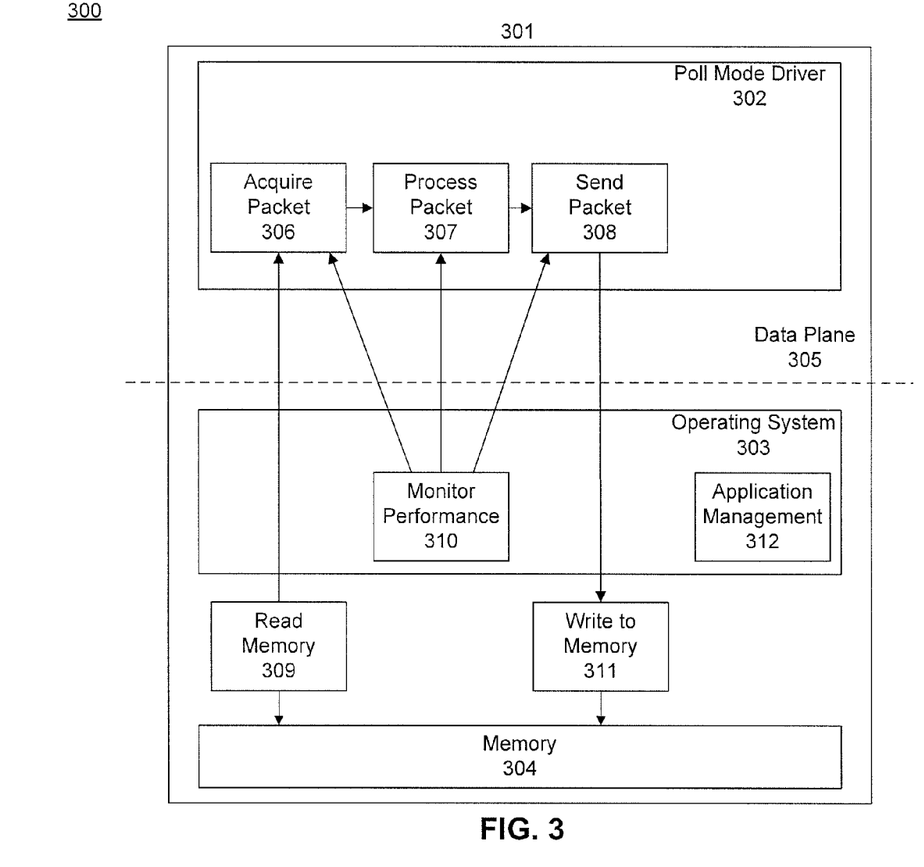
FIG. 3 is a flow diagram illustrating an exemplary process for dividing processor duties between a poll mode driver and operating system when run in userland mode, consistent with disclosed embodiments.

In certain embodiments, these applications may be operated in a userland mode. FIG. 3 illustrates the functionality of a poll mode driver and an operating system in userland mode as consistent with disclosed embodiments. In userland mode, the applications, such as application 301, may be implemented using one or more poll mode drivers, such as 302, and an operating system, such as 303. By way of example, the operating system may be Microsoft Windows™, Unix™, Linux™, Solaris™, or some other operating system. In this mode, the poll mode drivers may acquire and send packets to and from the data plane. FIG. 3 illustrates an exemplary process consistent with this embodiment where a poll mode driver 302 acquires a packet from an operating system in step 306, processed the packet in step 307, and sends the packet in step 308. The operating system, however, such as operating system 303, may access memory shared with the applications, such as memory 304, including reading from memory in step 309 and writing to memory in step 311. Accordingly, the operating system may be used to monitor the performance of the applications running in the data plane and/or the poll mode drivers, as in step 310. Additionally, as in step 312, the operating system may be able to provide management functions for the applications running in the data plane.

Alternatively, in certain embodiments, an application may be operated in a bare-metal mode. In bare-metal mode, the application may eliminate the need for an operating system by running as an executable byte code. Features like disk-drive support are left to the user to implement.

In another embodiment, the tool chain may include functions or libraries for protecting against a DDOS attack. These functions or libraries may include, for example, functions that identify a DDOS attack and/or establish a pipeline based on the identification of a DDOS attack to protect against it. These functions or libraries may use a single security appliance to read the data once by the data plane and may operate on the packets N number of times. The packets then may continue through the system or exit the system.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, where the described implementation includes software, the disclosed embodiments may be implemented as a combination of hardware and software or in firmware. Examples of hardware include computing or processing systems, including personal computers, servers, laptops, mainframes, micro-processors, and the like. Additionally, although disclosed aspects are described as being stored in a memory on a computer, one skilled in the art will appreciate that these aspects can also be stored on other types of computer-readable storage media, such as secondary storage devices, like hard disks, floppy disks, a CD-ROM, USB media, DVD, or other forms of RAM or ROM.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), XML, Java, C++, JavaScript, HTML, HTML/AJAX, Flex, Silverlight, or any other now known or later created programming language. One or more of such software sections or modules can be integrated into a computer system.

The embodiments described herein are exemplary only, and it will be apparent to those skilled in the art that various modifications and variations can be made in the disclosed systems and processes without departing from the scope of the invention. For example, embodiments may be practiced using some or all of the features discussed herein. Other embodiments will be apparent to those skilled in the art from consideration of the specification and practice of the invention disclosed herein. It is intended that the specification and examples be considered as exemplary only, with a true scope and spirit being indicated by the following claims and their full scope equivalents. Further, it should be understood that, as used herein, the indefinite articles "a" and "an" mean "one or more" in open-ended claims containing the transitional phrase "comprising," "including," and/or "having."

What is claimed is:

1. A method of processing in a data plane, comprising:
creating, via an application operating in userland mode, a plurality of Domain Name System (DNS) packets, wherein each packet comprises a DNS lookup instance;
acquiring, via a userland poll mode driver, the plurality of DNS packets;
processing, via the userland poll mode driver, the plurality of DNS packets in the data plane, wherein processing the plurality of DNS packets comprises querying one or more databases storing DNS information;
generating response packets that comprise responses to the plurality of DNS packets; and
sending the response packets from the data plane via the userland poll mode driver, wherein an operating system monitors a performance of the application and the userland poll mode driver,
wherein the processing comprises processing without using a hypervisor by:
causing the userland poll mode driver to acquire the plurality of DNS packets from the operating system; and
sending the plurality of DNS packets to the data plane; and
wherein the operating system accesses memory shared with one or more applications causing the userland poll mode driver to acquire the plurality of DNS packets from the operating system.

2. The method of claim 1, wherein the processing further occurs without using a hypervisor by operating via executable byte code.

3. The method of claim 1, wherein at least one or more of the following occur in Open System Interconnection (OSI) layer 4 or above:
creating the plurality of DNS packets;
processing the plurality of DNS packets;
generating the response packets; or
sending the response packets.

4. The method of claim 1, wherein the processing comprises:
identifying a source IP address or destination port for each DNS packet of the plurality of DNS packets; and
filtering the plurality of DNS packets based on the identified source IP address or destination port of each DNS packet of the plurality of DNS packets.

5. The method of claim 1, further comprising:
receiving a search query associated with packet header or packet payload data;
identifying one or more DNS packets from the plurality of DNS packets based on the search query; and
filtering the plurality of DNS packets based on the identification.

6. The method of claim 1, wherein generating the response packets comprises generating the response packets in the data plane.

7. The method of claim 1, wherein querying one or more databases storing DNS information comprises:
configuring a database of the one or more databases to be ready for DNS look ups;
creating arrays of lookup adaptor instances; and
running a process query method in an assigned lookup adaptor instance.

8. The method of claim 1, wherein the processing comprises load-balancing the packet processing by at least one of:
assigning one or more logical cores to a network port of one or more network ports;
assigning one or more RX/TX queue pairs to a network port of the one or more network ports; or
assigning one or more logical cores associated with different cores to the one or more RX/TX queue pairs.

9. The method of claim 1, wherein the processing comprises protecting against a DDOS attack.

10. The method of claim 9, wherein the protecting against a DDOS attack further comprises at least one of:
identifying the DDOS attack; or
establishing a pipeline based on the DDOS attack identification.

11. The method of claim 1, wherein the application runs in a loop on an assigned logical core.

12. The method of claim 1, wherein the processing comprises:
forwarding the plurality of DNS packets into a network packet stream;
time-stamping each DNS packet associated with the network packet stream; and
dividing the network packet stream into a plurality of network packet streams, wherein each of the plurality of network data streams is associated with a different data file from a plurality of data files.

13. The method of claim 12, further comprising:
reconstituting packets associated with the plurality of data files into a single data stream based at least on the time-stamping.

14. A system for processing in a data plane, comprising:
a processor;
a network interface; and
a memory having instructions that, when executed by the processor, cause the processor to perform operations including:
 creating, via an application operating in userland mode, a plurality of Domain Name System (DNS) packets, wherein each packet comprises a DNS lookup instance;
 acquiring, via a userland poll mode driver, the plurality of DNS packets;
 processing, via the userland poll mode driver, the plurality of packets in the data plane, wherein processing the plurality of DNS packets comprises querying one or more databases storing DNS information;
 generating response packets that comprise responses to the plurality of DNS packets; and
 sending the response packets from the data plane via the userland poll mode driver, wherein an operating system monitors a performance of the application and the userland poll mode driver,
 wherein the processing comprises processing without using a hypervisor by:
  causing the userland poll mode driver to acquire the plurality of DNS packets from the operating system; and
  sending the plurality of DNS packets to the data plane; and
 wherein the operating system accesses memory shared with one or more applications causing the userland poll mode driver to acquire the plurality of DNS packets from the operating system.

15. The system of claim 14, wherein the operations further comprise:
load balancing the packet processing by at least one of assigning one or more logical cores to a network port of one or more network ports, assigning one or more RX/TX queue pairs to a network port of the one or more network ports, or assigning one or more logical cores associated with different cores to the one or more RX/TX queue pairs.

16. A non-transitory computer-readable medium storing an application for processing in a data plane which, when executed by a processor, performs a method comprising:
 creating, via the application operating in userland mode, a plurality of Domain Name System (DNS) packets, wherein each packet comprises a DNS lookup instance;
 acquiring, via a userland poll mode driver, the plurality of DNS packets;
 processing, via the userland poll mode driver, the plurality of DNS packets in the data plane, wherein processing the plurality of DNS packets comprises querying one or more databases storing DNS information;
 generating response packets that comprise responses to the plurality of DNS packets; and
 sending the response packets from the data plane via the userland poll mode driver, wherein an operating system monitors a performance of the application and the userland poll mode driver,
 wherein the processing comprises processing without using a hypervisor by:
  causing the userland poll mode driver to acquire the plurality of DNS packets from the operating system; and
  sending the plurality of DNS packets to the data plane; and
 wherein the operating system accesses memory shared with one or more applications causing the userland poll mode driver to acquire the plurality of DNS packets from the operating system.

17. The non-transitory computer-readable medium of claim 16, wherein the method further comprises:
load balancing the packet processing by at least one of assigning one or more logical cores to a network port of one or more network ports, assigning one or more RX/TX queue pairs to a network port of the one or more network ports, or assigning one or more logical cores associated with different cores to the one or more RX/TX queue pairs.

* * * * *